Oct. 28, 1958  D. A. ROGERS  2,857,962
METHODS FOR TREATING LATICES
Filed Jan. 29, 1954
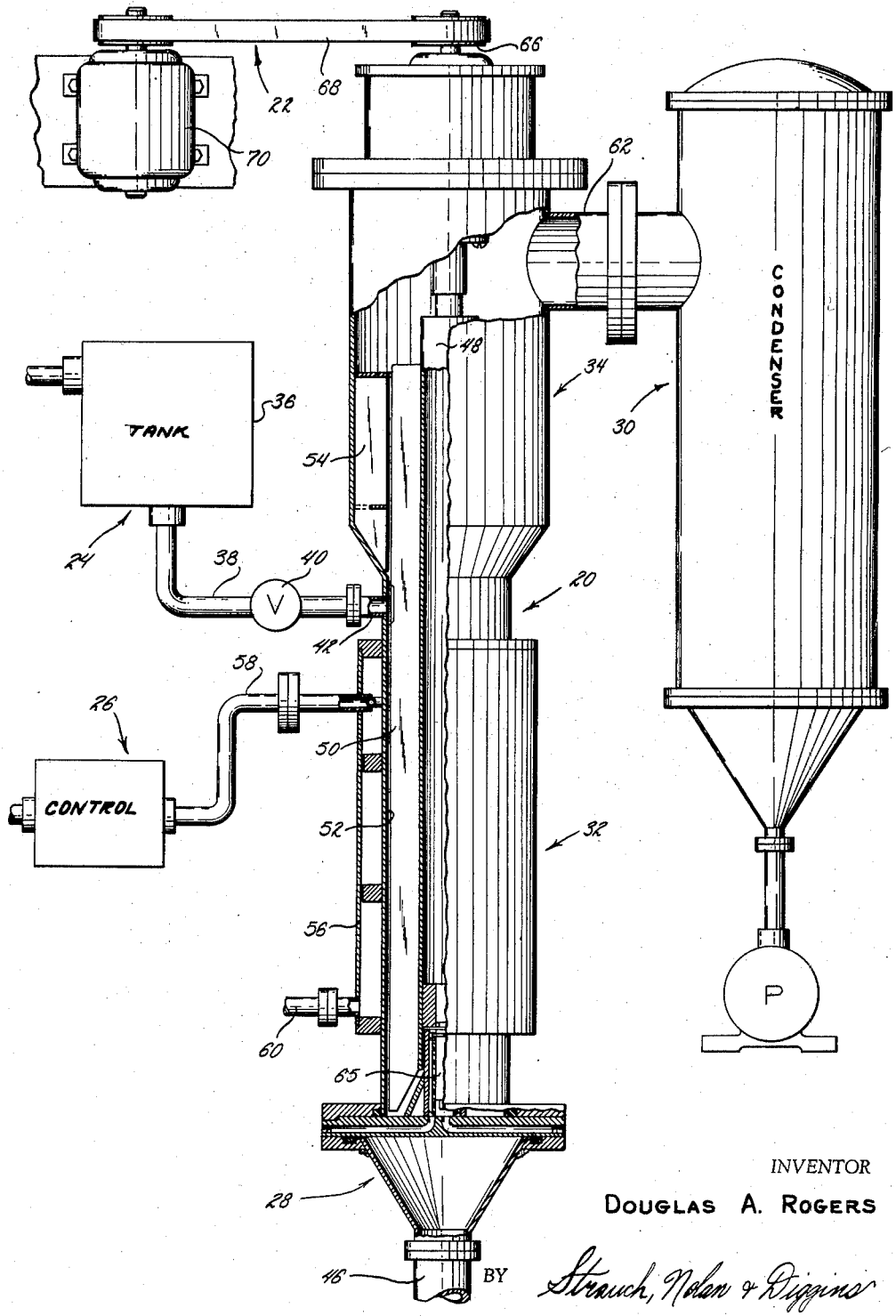
INVENTOR
DOUGLAS A. ROGERS
BY Strauch, Nolan & Diggins
ATTORNEYS United States Patent Office 2,857,962
Patented Oct. 28, 1958

2,857,962

METHODS FOR TREATING LATICES

Douglas A. Rogers, Orange, Mass., assignor to Rodney Hunt Machine Company, Orange, Mass., a corporation of Massachusetts Application January 29, 1954, Serial No. 407,135

3 Claims. (Cl. 159—49)

This invention relates to methods for concentrating latices and more particularly to continuous methods in which the concentration is effected by extremely rapid evaporation.

The term "latex" as used herein is intended to include natural and synthetic rubber latices and similar plastic latices. The natural rubber latices are exemplified by the latex tapped from the *Hevea brasiliensis* tree and the synthetic latices include a number of aqueous dispersions of synthetic elastomeric and resinous substances formed by polymerization of emulsified monomers. Typical of these latices is the latex known as GR–S which is of the butadiene-styrene type. The plastic latices include polyvinyl chloride emulsions.

As is well known, natural rubber, synthetic rubber and plastic latices are emulsions of organic materials in a serum largely composed of water. The properties of the emulsion depend to a large extent on the orgin of the material, the nature of the organic molecules composing the dispersed phase, the particle size of the dispersed phase, the pH of the emulsion and the presence of emulsifying agents such as soaps, synthetic detergents, and monomeric organic substances such as styrene, butadiene, acrylonitrile, vinyl chloride, etc.

When natural latex is tapped it has a pH of 7 (neutral) but immediately upon exposure to the effects of light, oxygen or enzymes, the acidity increases and if this process is permitted to progress sufficiently, the acidity may reach a pH of 5.8 which causes spontaneous coagulation. In accordance with conventional practice, ammonia or potassium hydroxide are widely used as preservatives and coagulation inhibitors and are usually added immediately to the tapped latex to establish a pH of from 10 to 10.5. In order to render the latex suitable for most commercial applications it is necessary to remove or "strip" the ammonia or other preservatives from the latex and the methods of the present invention have been successfully applied to this "stripping" which is included in the term concentration as used herein.

In connection with synthetic latices it is often necessary to remove or recover monomers either as a part of the concentration process or separately and the term concentration as used herein is intended also to include this "degassing" process.

In recent years there have been ever increasing efforts to develop improved methods for concentrating latices not only to decrease the cost of the long distance shipments but also to obtain concentrated latex of improved quality and to provide latex concentrates which are especially suited for certain specialized uses, for example, foam rubber.

Prior concentration methods to which considerable attention has been given include creaming, centrifugation, evaporation including spray drying, electro-decantation and filtration.

Concentration of natural latex by evaporation with which the present invention is primarily concerned yields a concentrate having properties which are quite different from concentrates yielded by the other methods previously adopted and the concentrate produced by evaporation is referred to as "whole latex" while the rubber produced from the concentrate is termed "whole latex rubber."

Despite the wide spread demand for a commercially practical process for concentrating latex by evaporation no known method of this type has achieved more than limited acceptance because of relatively high coagulation losses which are incurred even in the treatment of relatively insensitive latices such as GR–S.

One of the most commonly used of the prior methods is known as the Revertex method in which the latex is introduced into a heated drum revolving about a horizontal axis and is agitated within the drum by a free internal roller. This method is a batch process in which the best available machines have a yield of approximately 40 gallons per hour. It is believed that the limited acceptance of this method is due to this limited production rate and also to the difficulties in maintaining uniformity of the concentrated product. Other batch processes, such as pan evaporation, have been attempted with a signal lack of success due again to the limited yield rate with commercially practical machinery and to the failure to produce a concentrate of uniformly acceptable quality.

It has also been proposed with varying success to concentrate rubber latices by heating the latex in plate or tubular type heat exchangers and subsequently permitting the latex to flash into a flash tank. In order to obtain sufficient concentration, this process must be repeated a number of times. It has also been proposed to expose thin films of latex to the effect of warmed air streams or to the action of "live" streams of steam in a column or flash tank.

All of these prior batch methods have the inherent disadvantages of requiring the processing of large amounts of latex at a given time and requiring a relatively long time to complete the process to provide sufficient concentration. They fail to provide uniformity of treatment and in most cases involve relatively large losses to foam and coagulation.

Despite the wide range in the composition of the emulsion and the corresponding variation in their properties, all such latices have certain common properties which have given rise to common processing problems. The most important of these troublesome properties are:

(1) A tendency to coagulate with shearing action.
(2) The property of air drying to form films.
(3) Sensitivity to heat and changes of pH.
(4) Increase in viscosity with increased concentrations.
(5) A tendency to form stable and copious foam during processing.

The latex emulsion will be destroyed if coagulation, air drying, overheating, change in pH, or too great a change in concentration, occurs. The resulting material generally fouls equipment so that operations must be suspended with consequent loss of time and loss in value of the material in process.

One of the difficulties encountered in previous evaporating concentrating processes stems from the concentration-viscosity characteristic of the common rubber latices. Under normal conditions concentration greatly increases viscosity. For example at a concentration of 60% solids the latex is creamy and at a concentration of 75% solids it becomes a thick paste. In higher concentrations it tends to become a dry solid. The difficulty in mechanically handling latex in the higher concentrations has in the past prevented the development of a continuous commercially practical process for the concentration of latex by evaporation. It is for this reason among others that all prior evaporation processes have been batch processes.

It is accordingly the primary purpose and object of the present invention to provide novel continuous methods for concentrating liquid latex by evaporation.

It is also an object to provide novel methods of concentrating liquid latex which produce a concentrate having substantially higher solids content than previously obtainable on a commercial scale.

It is a further object to provide novel methods for the concentration of latex which assure uniformity of treatment to all portions of the processed material thus producing a concentrate of uniformly high quality.

It is an additional object of the invention to provide novel methods for concentrating latex which substantially reduce the material losses occasioned by foaming and coagulum.

It is a further object of the present invention to provide novel methods for concentrating latex in which concentrate is produced at high volume despite a substantial reduction in the quantity of latex in process at any given time.

Other objects and advantages will become apparent as the description proceeds in connection with the accompanying drawing in which the single figure illustrates a preferred apparatus for carrying out the method of the present invention.

Essentially the methods of the present invention by which the above stated objects are accomplished comprise passing the liquid latex in a thin turbulent film rapidly over the heated surface of an evaporator. In the preferred apparatus, latex to be processed is fed into the top of an elongated vertical evaporator tube which is provided with a heated jacket and is forced against the heated wall by rotor blades which extend along the entire length of the evaporator tube. This action forms a turbulent thin film which is held centrifugally against the heated wall. The film is moved downwardly by gravity and thus describes a downwardly directed helical path to the outlet provided at the bottom of the evaporator chamber. The vapors removed from the concentrate pass upwardly between the rotor blades through the evaporator tube and are withdrawn through a vacuum system or leave through a vapor outlet.

The centrifugal action of the rotor blades throws any droplets which may be entrained in the vapor outwardly into the film and any droplets which rise above the top of the evaporator section are recovered in a separator section and returned to the evaporator.

The preferred apparatus for carrying out the novel methods of the present invention which is illustrated in the single figure, comprises an evaporator 20, an evaporator drive 22, a product feed system 24, temperature control apparatus 26 for the evaporator, a product outlet system 28 and a condenser vacuum system 30, all with appropriate interrelated controls of conventional design.

The principal element of this invention is the evaporator 20 which is preferably of the type disclosed and described in application Serial Number 253,126, filed October 25, 1951, now Patent 2,774,415, and to which reference may be made for a more detailed disclosure.

The evaporator 20 includes a lower evaporator section 32 and an upper separator section 34. The liquid to be concentrated is introduced from the supply tank through a pipe 38 and control valve 40 to a fitting 42 located between the evaporator and separator sections. The liquid flows down through the evaporator section 32 by gravity and the concentrate is withdrawn through a suitable product removal system such as a barometric leg 46. A rotor 48 extends vertically along the entire length of the unit and is provided with a plurality of vanes 50 which extend radially outwardly into close proximity with the inner tubular wall 52 of the evaporator section. The clearance between the blades and wall may be 1/32" or more at relatively higher speeds. The outer edge of the upper portion of the vanes is disposed in similar close clearance relationship with a number of radially extending stator vanes 54 formed within the enlarged separator section 34.

The evaporator section is provided with a jacket 56 to which steam or other suitable heating medium is supplied through a conduit 58 in amounts determined by the control apparatus 26, which may be of any conventional design capable of maintaining a uniform temperature within the jacket 56. The condensate is removed from the jacket 56 through a conduit 60.

A suitable condenser 30 is connected to the evaporating and concentrating unit at a point above the evaporator section through a fitting 62. The condenser may be of any conventional construction and should be capable of removing the vapors issuing from the liquid as it is concentrated and maintaining a constant pressure within the unit of from 10 to 200 mm. Hg or higher.

The rotor is journalled in a suitable bearing construction 65 at its lower end and at its upper end is provided with a pulley 66 drivingly connected through a belt 68 to a suitable power source 70. Provision may be made for varying the rotor speed either by employing a variable speed power source or a variable speed transmission between the power source and the rotor 48.

Using the above-described apparatus, liquid latex is concentrated in the following manner in accordance with the methods of the present invention.

It is first necessary to establish a set of predetermined conditions of rotor speed, temperature and pressure within the evaporating unit. The required heating jacket temperature is established by adjustment of the control mechanism 26, the necessary vacuum is set through proper adjustment of the apparatus 30 and proper speed is set either by design of the rotor and drive or by adjustment of the variable drive mechanism if one is provided.

When these conditions are established, the valve 40 is opened to permit the flow of the liquid latex into the evaporating unit through the fitting 42 at a suitable feed rate.

It has been discovered that latex flow conditions must be established before substantial evaporation takes place to avoid coagulation. If the full evaporation temperature and pressure conditions are set prematurely, the film will coagulate thus preventing flow and necessitating disassembly and cleaning of the machine. Accordingly, after the desired flow of latex is established as evidenced by the flow of latex out of the bottom of the unit, the heating jacket temperature is raised to the desired operating value depending upon the vacuum and the character of the latex.

The liquid flows down the wall 52 by gravity and is forced against the heated wall by the rotor vanes 50 and forms a uniform thin turbulent film which is centrifugally held to the wall. The liquid latex thus describes a downwardly directed helical path through the section 32 and the concentrated latex flows out through the barometric leg 46.

As the liquid latex flows down the wall 52 vapor is driven off and passes upward in the spaces between the rotor vanes. The vanes strike droplets of foam or liquid entrapped in the vapor which is passing upwardly and drive these droplets outwardly against the wall 52 where they become a part of the film being processed. All of the vapor from the evaporating chamber 32 passes upwardly through the separating chamber 34 and any entrapped foam or liquid is driven outwardly in this section by centrifugal force toward the wall of the separating chamber and flows down the wall and the stator vanes 54 back into the evaporating chamber. The speed of rotation of the rotor and angular distance between the adjacent vanes is such that every part of the vapor passing through the unit is subjected to the action of the vanes.

It is to be noted that there is no area within either the evaporator or separator sections of the unit where liquid or foam can collect free from the action of the rotating vanes. Accordingly, losses due to foam and entrainment are substantially eliminated.

It is an important feature of the invention that the total time of the passage of the latex along the heated evaporating surface is very short, for example about five to forty seconds.

Because of this extremely short processing time many of the adverse effects previously associated with the heating of liquid latex and the consequent deterioration usually associated with the processing of latices at elevated temperatures are avoided in the present methods and since the latices with which the present invention is primarily concerned are temperature sensitive substances, superior concentrates are provided even where the concentration is carried to a point hitherto unobtainable.

The extremely rapid process speed coupled with the high turbulence maintained in the evaporating film minimizes coagulation. The same conditions prevent the formation of films by air drying which is usually unavoidable in prior known processes.

Further, because of the relatively low temperatures at which the latex may be treated and the short period of time to which it is subjected to these temperatures the deterioration of the latex caused by heating in prior processes is substantially avoided. Also the changes in pH occasioned by the removal of ammonia during the concentrating process do not cause coagulation because of the rapid process speed and the tubulence maintained at all times within the heated latex film.

Tests have also shown that in the present method foam problems are substantially eliminated because of the mechanical action of the rotor in subjecting the foam to violent mechanical action and returning the droplets which comprise the foam by centrifugal action to the film being processed. In some cases stabilizing and defoaming agents can be added to further decrease the possibility of serious foam formation.

The extremely rapid process speed has another important advantage in that it minimizes mechanical difficulties encountered in previous slower processes due to the high viscosity attained by the latices as a result of increased concentration. The viscosity of the liquid latex in the present methods is held at a sufficient low value throughout the concentrating process so that its flow is not impeded and there is no interference of any kind with its effective treatment. This is true even in concentrations reaching 72% solids which might be attained by the present methods.

Thus the present methods overcome the five most troublesome processing difficulties encountered in previous processes as outlined above.

As pointed out above, the present methods have also been applied with success to the stripping of ammonia from natural latex. In the process described above substantially complete stripping is accomplished in the course of the concentration of the latex because of the high volatility of the ammonia in the unconcentrated latex. However, in many cases it is desirable to strip the ammonia from the latex without substantially increasing the solids content of the latex. In this case the feed rate of the unconcentrated latex may be substantially increased and the temperature maintained within the steam jacket 56 substantially reduced. For example, rates as high as 180 lbs./hr./sq. ft. have been obtained while reducing the alkalinity from 0.7% to nil. In this specific case solids content was increased from 62% to 64% at 100° F.

In each case the stripping is accomplished by the passage of the vapors upwardly through the evaporator section 32 of the unit over the film of latex held centrifugally against the wall 52. If desired this action can be accelerated by the utilization of an upwardly directed current of steam which may be introduced into the unit just below the lower end of the heating jacket.

Synthetic rubber latex such as GR-S may be treated with similarly remarkably good results by appropriate variations in the operating condition. Concentrated latex of superior quality can be produced with solid contents up to 60% or above completely or almost completely stripped of monomers such as styrene, acrylonitrile, butadiene, vinyl chloride, etc.

Typical operation data applicable to the processing of synthetic and natural rubber latices are shown in the following table.

|  | Synthetic Rubber Latex | Natural Rubber Latex |
|---|---|---|
| Evaporator absolute pressure, mm. Hg | 60 | 50. |
| Heating jacket temp., ° F | 225 | 220. |
| Heating medium | Steam | Steam.. |
| Vapor temp., ° F | 107 | 100. |
| Residue temp., ° F | 107 | 100. |
| Feed temp., ° F | 97 | 97. |
| Feed rate, lb./hr./sq. ft | 75 | 93. |
| Vapor rate, lb./hr./sq. ft | 28 | 35. |
| Residue rate, lb./hr./sq. ft | 47 | 58. |
| Rotor peripheral speed, ft./sec | 45 | 45. |
| Composition of feed | 41% solids | 45% solids; 1-2% $NH_3$ and some soap. |
| Composition of product | 60% solids; no coagulum. | 72% solids; no coagulum. |
| Heat transferred, 1,000 B. t. u./hr./sq. ft | 30.3 | 36.2 |
| Over-all coefficient (U), B. t. u./hr./sq. ft./° F. | 260 | 300. |

Tests have shown that continuous precise and positive control of the operating conditions including feed rate, temperature, vacuum and rotor speed are essential for successful commercial operation. These operating conditions depend in large measure upon the nature of the latex being treated and the typical optimum values of these conditions given above in connection with the treatment of natural rubber latex and a synthetic latex such as GR-S are illustrative of the range of these operating conditions.

In general it has been found that some synthetic latices, particularly certain compounded latices, may be treated at considerably higher temperatures than natural rubber latex and concentration has been successfully effected at film temperatures as high as 160° F. The upper temperature limit is ordinarily established by the tendency of the particular latex involved to coagulate. Temperatures below 40° F. ordinarily should be avoided in order to prevent freezing of the film and avoid the necessity of the utilization of oversize vacuum apparatus to maintain the corresponding low pressure within the processing apparatus. The minimum temperature for processing synthetic latices may be as high as 140° to permit successful recovery of the stripped monomers, although concentration of the latex and removal of residual monomers is usually affected at substantially lower temperatures.

Rotor speed is ordinarily set so as to prevent substantial entrainment and carry-over and speeds of about 45 feet per second at the tip are generally satisfactory.

The feed rate will ordinarily be determined by the degree of concentration desired, a decrease in feed rate producing a corresponding increase in concentration.

In the case of synthetic and plastic latices, it has been found that improved results may be obtained by stripping monomers in a single pass and accomplishing further concentration in a second unit or a second single pass. Specifically it has been discovered that after removal of the monomers with a slight increase in concentration some materials can be concentrated very easily to a high solids content.

In connection with the stripping of the monomers from the synthetic latices it is contemplated that the condensing and vacuum producing apparatus 30 will include apparatus suitable for the recovery of such substances.

From the foregoing it is apparent that the above stated objects of the invention have been attained by the provision of methods for the concentration of latices continuously, economically, and at higher volume rates than heretofore obtainable with apparatus of comparable cost. Since in the present methods all of the mechanical, thermal, and chemical factors to which the latices are sensitive are subject to precise control, uniformity of treatment of the latex is thus assured continuously and economically producing a product of uniformly high quality.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A process for concentrating liquid latex comprising, introducing said latex in the upper portion of a vertically elongated partially evacuated chamber, moving said latex downwardly in a helical path in a thin turbulent film at a relatively rapid rate through said chamber and raising the temperature of the latex to evaporate the volatile constituents after the latex has begun to move through said chamber.

2. A process for concentrating latex in a vertically elongated chamber comprising, evacuating said chamber to establish a pressure of approximately 50 mm. Hg, introducing said latex at the upper portion of said chamber, moving said latex downwardly in a helical path in a thin turbulent film at a relatively rapid rate through said chamber, heating said chamber after the latex starts to move through the chamber to a temperature sufficient to cause evaporation of the volatile constituents of the film and withdrawing the vapor from the chamber.

3. A process for concentrating a heat sensitive liquidous material subject to coagulation at the temperatures employed, said process including the steps of initiating gravity flow of said material over a substantially vertical surface, subjecting the material on the vertical surface to the action of rotating members to produce a thin turbulent film of said material on the vertical surface, reducing the pressure at said film below atmospheric and then raising the temperature of the vertical surface to evaporate the material after formation of the thin turbulent film.

References Cited in the file of this patent

UNITED STATES PATENTS

| | | |
|---|---|---|
| 1,405,085 | Zahm | Jan. 31, 1922 |
| 1,443,714 | Merrell | Jan. 30, 1923 |
| 1,466,579 | Colliver | Aug. 28, 1923 |
| 1,732,805 | Yarmett | Oct. 22, 1929 |
| 1,981,691 | De Schepper | Nov. 20, 1934 |
| 2,545,028 | Haldeman | Mar. 13, 1951 |
| 2,546,380 | Zahm | Mar. 27, 1951 |
| 2,596,086 | Muller | May 6, 1952 |

FOREIGN PATENTS

| | | |
|---|---|---|
| 12,096 | Great Britain | of 1901 |
| 243,016 | Great Britain | Sept. 2, 1926 |
| 330,805 | Great Britain | June 19, 1930 |
| 248,793 | Switzerland | May 31, 1947 |
| 70,522 | Netherlands | Aug. 15, 1952 |

OTHER REFERENCES

Noble: Latex in Industry, New York Rubber Age, 1953, page 144.

Hauser, E. A.: "The Revertex Process," Kautschuk, January 1927, pages 2 to 16.